United States Patent
Nalley et al.

(10) Patent No.: US 8,208,892 B2
(45) Date of Patent: *Jun. 26, 2012

(54) REMOTELY ACTIVATABLE LOCATOR SYSTEM AND METHOD USING A WIRELESS LOCATION SYSTEM

(75) Inventors: James Elwood Nalley, Corinth, TX (US); Christopher Daniel Buehler, Dallas, TX (US)

(73) Assignee: TruePosition, Inc., Berwyn, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/686,239

(22) Filed: Jan. 12, 2010

(65) Prior Publication Data

US 2010/0144309 A1 Jun. 10, 2010

Related U.S. Application Data

(63) Continuation-in-part of application No. 12/029,951, filed on Feb. 12, 2008.

(60) Provisional application No. 60/889,426, filed on Feb. 12, 2007.

(51) Int. Cl.
*H04M 11/04* (2006.01)
(52) U.S. Cl. ............... 455/404.1; 455/404.2; 340/825.49
(58) Field of Classification Search ............... 455/404.1, 455/404.2; 340/825.49
See application file for complete search history.

(56) References Cited

U.S. PATENT DOCUMENTS

| | | | |
|---|---|---|---|
| 4,908,629 A | 3/1990 | Apsell et al. | |
| 5,021,794 A | 6/1991 | Lawrence | |
| 5,485,163 A | 1/1996 | Singer et al. | |
| 5,652,570 A | 7/1997 | Lepkofker | |
| 5,742,233 A | 4/1998 | Hoffman et al. | |
| 5,929,777 A * | 7/1999 | Reynolds | 340/8.1 |
| 6,067,018 A | 5/2000 | Skelton et al. | |
| 6,154,658 A * | 11/2000 | Caci | 455/466 |
| 6,243,039 B1 | 6/2001 | Elliot | |
| 6,275,164 B1 | 8/2001 | MacConnell et al. | |
| 6,360,106 B1 | 3/2002 | Besson | |
| 6,362,778 B2 | 3/2002 | Neher | |
| 6,449,472 B1 * | 9/2002 | Dixit et al. | 455/404.1 |
| 6,593,851 B1 | 7/2003 | Bornstein | |
| 6,693,585 B1 | 2/2004 | Macleod | |
| 7,084,771 B2 | 8/2006 | Gonzalez | |
| 7,102,508 B2 | 9/2006 | Edelstein et al. | |
| 7,330,122 B2 | 2/2008 | Derrick et al. | |
| 2002/0186135 A1 | 12/2002 | Wagner | |
| 2003/0050039 A1 * | 3/2003 | Baba et al. | 455/404 |
| 2004/0121822 A1 * | 6/2004 | Kartchner | 455/574 |

(Continued)

FOREIGN PATENT DOCUMENTS

EP 1617639 1/2006

(Continued)

OTHER PUBLICATIONS

International Search Report dated Jun. 26, 2008.

*Primary Examiner* — Charles Shedrick
(74) *Attorney, Agent, or Firm* — Woodcock Washburn LLP

(57) ABSTRACT

A method for locating an entity attached to a locator device comprises receiving, at the locator device, a message over a cellular network. Responsive to receiving the message, a call over the cellular network is automatically initiated to enable a party answering the call to determine a location of the locator device.

29 Claims, 6 Drawing Sheets

U.S. PATENT DOCUMENTS

| | | |
|---|---|---|
| 2004/0203601 A1 | 10/2004 | Morriss et al. |
| 2004/0230823 A1 | 11/2004 | Zakaria |
| 2005/0014482 A1 | 1/2005 | Holland et al. |
| 2005/0136885 A1 * | 6/2005 | Kaltsukis .................. 455/404.1 |
| 2005/0153729 A1 | 7/2005 | Logan |
| 2006/0028346 A1 | 2/2006 | White |
| 2006/0255935 A1 | 11/2006 | Scalisi et al. |
| 2007/0155412 A1 | 7/2007 | Kaltsukis |
| 2009/0131054 A1 | 5/2009 | Zhang |

FOREIGN PATENT DOCUMENTS

| | | |
|---|---|---|
| GB | 2394147 | 11/2002 |
| GB | 2 407 937 | 5/2005 |
| GB | 2409363 | 6/2005 |
| JP | 2005142875 | 6/2005 |
| WO | WO 95/03553 | 2/1995 |
| WO | WO 96/26614 | 8/1996 |
| WO | WO 02/39643 | 5/2002 |

* cited by examiner

REMOTELY ACTIVATABLE LOCATOR SYSTEM AND METHOD USING A WIRELESS LOCATION SYSTEM

CROSS REFERENCE

This patent application is a continuation-in-part of U.S. patent application Ser. No. 12/029,951, filed on Feb. 12, 2008, entitled "Remotely Activatable Locator System and Method," which claims the benefit of U.S. Provisional Patent Application No. 60/889,426, filed Feb. 12, 2007. The contents of these applications are hereby incorporated by reference in their entireties.

TECHNICAL FIELD

The present disclosure relates generally to methods and apparatus for locating wireless devices, also called mobile stations (MS), such as those used in analog or digital cellular systems, personal communications systems (PCS), enhanced specialized mobile radios (ESMRs), and other types of wireless communications systems. More particularly, but not exclusively, the present invention relates to methods for obtaining a location estimate from a remotely activated personal wireless device for delivery to a public safety organization.

BACKGROUND

Personal tracking devices have been found to be useful in locating lost objects and, more importantly, missing persons. Such tracking devices typically use a network of Global Positioning Satellites (GPS) in low earth orbit that broadcast precise timing signals from on-board atomic clocks. Using triangulation formulas, a device that picks up signals from several satellites simultaneously can determine its position in global coordinates, namely latitude and longitude. Thus, an object and/or person carrying the GPS device may be located provided the appropriate equipment and trained personnel are available for determining the location of the GPS device. However, GPS signals, like any other satellite signal, are prone to numerous interferences including atmospheric disturbances, such as solar flares and naturally occurring geomagnetic storms. In addition, man-made interference can also disrupt, or jam, GPS signals. Further, anything that can block sunlight can block GPS signals. This raises the question of whether or not GPS is reliable in locating a missing and wandering person who may be in, or next to, a building, under a tree, in the brush, under a bridge, in an urban environment, in a vehicle or even a person who has fallen down and has their GPS unit covered by their own body.

Other known tracking devices use radio signal emitting transmitters. However, these types of tracking devices require an expensive receiver device in the area to receive and track the emitted radio signal. Thus, without the appropriate receiving device in the area and/or trained personnel capable of operating the receivers, these tracking devices would be useless for locating lost objects and/or missing persons.

The inventive techniques and concepts described herein apply to time and frequency division multiplexed (TDMA/FDMA) radio communications systems including the widely used IS-136 (TDMA), GSM, and OFDM wireless systems, as well as code-division radio communications systems such as CDMA (IS-95, IS-2000) and Universal Mobile Telecommunications System (UTMS), the latter of which is also known as W-CDMA. The Global System for Mobile Communications (GSM) model discussed above is an exemplary but not exclusive environment in which the present invention may be used.

BRIEF DESCRIPTION OF THE DRAWINGS

The foregoing summary as well as the following detailed description are better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Figure 1:
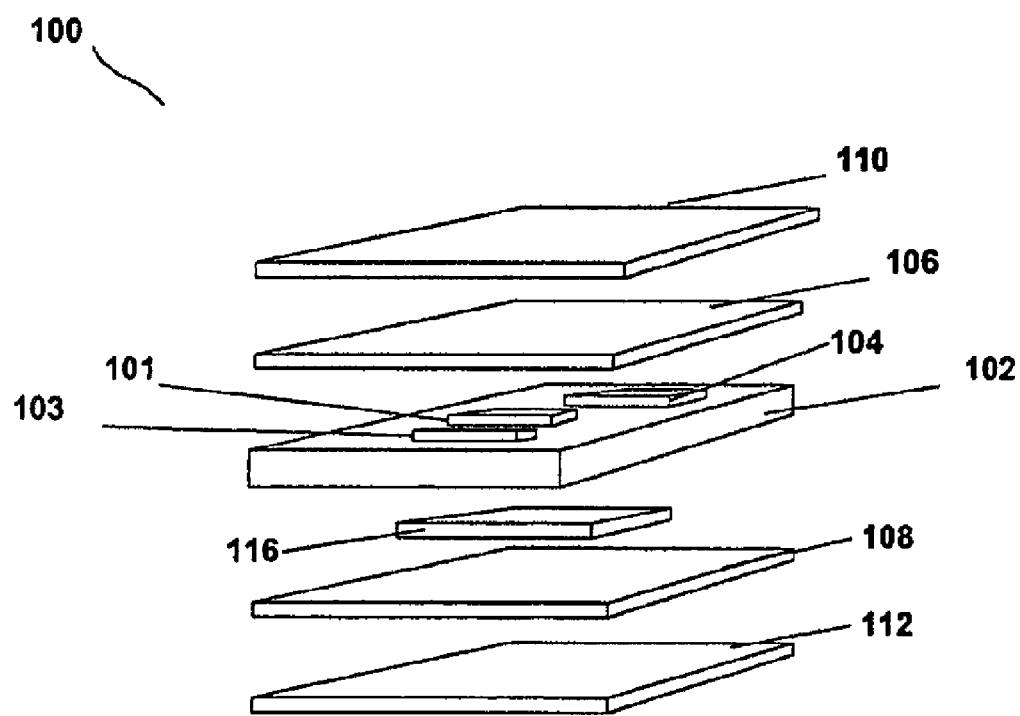
FIG. 1 is a diagram illustrating an embodiment of a locator device.

FIG. 1 is a diagram illustrating an embodiment of a remotely activatable tracking device 100. Device 100 comprises an electronic module 102 for transmitting and receiving messages over a cellular network. In some embodiments, electronic module 102 may be integrated with an onboard identity module 104. Electronic module 102 comprises processor 101 and memory 103 for processing and storing data. Processor 101 may be one or more microprocessors on electronic device 102. Device 100 further comprises a power source 106 and an antenna 108. In the embodiment illustrated in FIG. 1, electronic module 102, onboard identity module 104, power source 106, and antenna 108 are enclosed within an upper housing 110 and a lower housing 112.

Device 100 may be registered onto and maintain low-level (or standby) connectivity to a cellular network 114. Cellular network 114 is a network made up of a number of radio cells each served by a fixed transmitter, known as a base station. In some embodiments, cellular network 114 supports the Global System for Mobile communications (GSM) standard for mobile communications. GSM networks operate in four different frequency ranges (850/900 1800/1900 MHz frequency bands). However, most GSM networks operate in the 900 MHz or 1800 MHz bands.

In some embodiments, electronic module 102 may either be a dual-band GSM module supporting the 900 and 1800 MHz bands or may be a quad-band GSM module supporting all GMS frequency ranges. In addition, electronic module 102 may support data packet reception/transmission capabilities such as, but not limited to, by means of General Packet Radio Service (GPRS). General Packet Radio Service (GPRS) is a Mobile Data Service providing data rates from 56 up to 114 Kbps. GPRS may be used for services such as Wireless Application Protocol (WAP) access, Short Message Service (SMS), Multimedia Messaging Service (MMS), and for Internet communication services such as email and World Wide Web access. For example, SMS messages, typically referred to as text messaging, may be sent using GPRS and/or over control channels of cellular network 114. A control channel is a channel that allows data to be transmitted between a cellular device, such as device 100, and other devices using cellular network 114 infrastructures, such as a cell tower, even when device 100 is not communicating over a voice channel. Communicating over the control channel enables cellular network 114 to determine which network cell device 100 is currently in. In addition, the control channel may be used to send a message to a cellular device to inform the cellular device of an incoming call and to provide a pair of voice channel frequencies to use for the call. A voice channel is a communication channel having sufficient bandwidth to carry voice frequencies. In some embodiments, device 100 may support other standards for mobile communication and/or data packet transmission.

In some embodiments, electronic module 102 may include an embedded software environment that enables the development of essential capabilities such as mobile connectivity, location awareness, and device intelligence. For example, electronic module 102 may be used to monitor the status of device 100 and provide remote updates to device 100 over the control or traffic channels of cellular network 114. In addition, electronic module 102 may contain resident software that authenticates incoming messages. Device 100 enters an active state only upon receiving a properly authenticated remote activation message. During active state, device 100 initiates a method for locating the person or entity that is currently wearing or carrying device 100 as will be further described below. An entity as referenced herein may be a person, animal, or inanimate object. Further, electronic module 102 may provide functionality for initiating a multiparty call between different parties to facilitate locating the missing entity.

Onboard identity module 104 securely stores network-specific information such as, but not limited to, a service-subscriber key used to authenticate and identify a subscriber associated with device 100. A subscriber as referenced herein refers to a person or business entity to which device 100 is associated with. For example, the subscriber may be the person wearing or carrying device 100 or may be the person or entity responsible for the care of the person wearing or carrying device 100. In addition, device 100 may store a prerecorded audible message in memory located on electronic module 102 or on onboard identity module 104. The prerecorded audible message may be played to provide additional information as part of the method for locating the missing person or entity attached to device 100. For example, the prerecorded audible message may provide biographic data about the missing entity such as, but not limited to, name, age, height, weight, race, and medical history such as, but not limited to, pharmaceutical allergies. In addition, the prerecorded audible message may provide contact information of a party that initiated the activation of the device 100.

Device 100 is powered by power source 106. Power source 106 may include one or more rechargeable and/or disposable batteries. In some embodiments, power source 106 may be at least one or a combination of a lithium ion type battery, a lithium polymer battery, a nickel metal hydride (NiMH) type battery and/or other types of electrochemical cells. In some embodiments, power source 106 may also incorporate solar power energy or be kinetic-energy based.

Antenna 108 is a transducer designed to transmit or receive electromagnetic waves. In other words, antenna 108 converts electromagnetic waves into electrical currents and vice versa. Device 100 uses antenna 108 to transmit and receive radio frequency signals from cellular network 114. In some embodiments, antenna 108 may be a microstrip patch antenna. A microstrip patch antenna is a narrowband, wide-beam antenna fabricated by etching the antenna element pattern in metal trace bonded to an insulating dielectric substrate with a continuous metal layer bonded to the opposite side of the substrate which forms a ground plane.

In the embodiment illustrated in FIG. 1, device 100 comprises upper housing 110 and lower housing 112 to enclose the internal components of device 100. However, it should be understood that the components of device 100 may be enclosed by any number of means. In some embodiments, device 100 may be configured with minimal external connections and indicators in order to maintain a small and discrete physical profile. In some embodiments, device 100 may include electronic connections for the recharging of power source 106. In addition, in some embodiments, device 100 may have an indicator such as, but not limited to, an LED light or a graphical display indicating an approximate remaining battery charge.

In some embodiments, device 100 may be splash-proof or water-proof. In order to maintain the discreteness of device 100, in some embodiments, device 100 may be disguised as an accessory item. For example, the accessory item may include, but is not limited to, incorporating device 100 as part of a necklace, a bracelet, and/or as a lapel pin to enable a user to wear device 100 or carry device 100 on the user's person. Further, in some embodiments, device 100 may include of a global positioning system component 116. Thus, enabling device 100 to be located using multiple location techniques.

Figure 2:
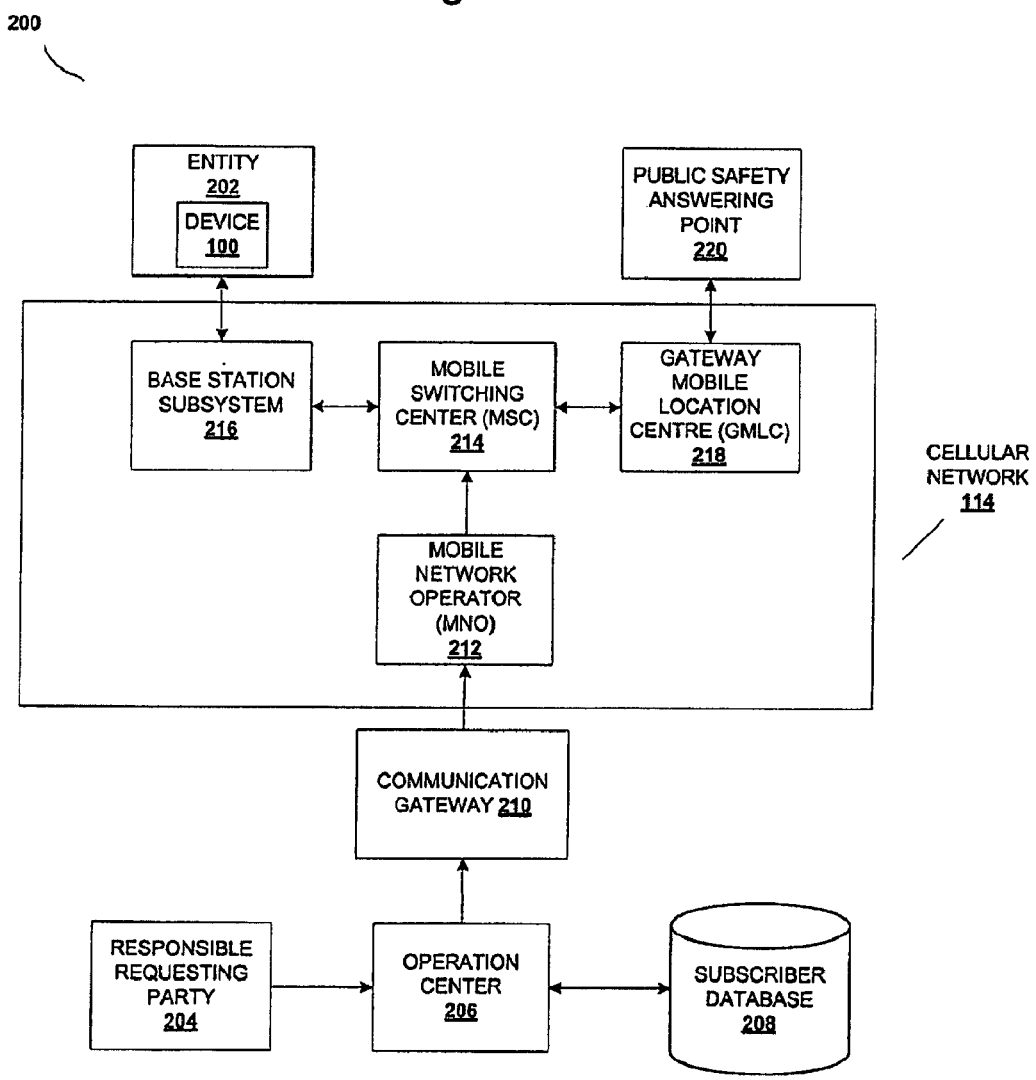
FIG. 2 is a block diagram illustrating an embodiment of a locator system for locating an entity attached to the locator device.

FIG. 2 is a block diagram illustrating an embodiment of a locator system 200 for locating an entity 202 attached to and/or associated with device 100. A responsible requesting party 204 reports entity 202 as missing to operation center 206. Operation center 206 is a place from which trained personnel may access information related to device 100 and communicate with device 100 over cellular network 114. Operation center 206 retrieves information regarding entity 202, responsible requesting party 204, and device 100 from subscriber database 208. Subscriber database 208 may be any type of data store including, but not limited to, a relational database. Subscriber database 208 may be a local database at operation center 206 or may be remotely located. Operation center 206 verifies the identity of responsible requesting party 204 using the data retrieved from subscriber database 208. For example, responsible requesting party 204 may have to provide a personal identification number (PIN) matching an authorization PIN stored in subscriber database 208. Upon proper verification, operation center 206 determines a particular device 100 associated with entity 202 and transmits a message over a communication gateway 210 to the particular device 100. Communication gateway 210 allows for the sending and receiving of messages to or from devices, such as, but not limited to, device 100, and is used to provide network connectivity to third parties. Communication gateway 210 transmits the message to cellular network 114 where it is received by a mobile network operator (MNO) 212.

Mobile network operator 212, also known as a wireless service provider, is a company that provides services for cellular subscribers. In some embodiments, mobile network operator 212 is a provider of a Global System for Mobile Communications (GSM) network. Mobile network operator 212 forwards the message to a Mobile Switching Center (MSC) 214. Mobile Switching Center 214 is a telephone exchange which provides circuit-switched calling, mobility management, and GSM services to the cellular devices roaming within the area that it serves. Mobile Switching Center 214 communicates with Base Station Subsystem (BSS) 216. Base Station Subsystem 216 is the section of cellular network 114 responsible for handling traffic and signaling between a cellular device and a network switching subsystem. Base Station Subsystem 216 carries out transcoding of speech channels, allocation of radio channels to mobile phones, paging, quality management of transmission and reception over the air interface and many other tasks related to the radio network. Mobile Switching Center 214 also communicates with Gateway Mobile Location Centre (GMLC) 218 to provide location services to Public Safety Answering Point (PSAP) 220. Public Safety Answering Point 220 is an agency, typically county or city controlled, responsible for answering public assistance or emergency calls, such as 9-1-1 calls for emergency assistance from police, fire, and ambulance services. Emergency dispatchers working at Public Safety Answering Point 220 are able to determine the location of device 100 using some form of radiolocation, as further described below, and information provided by Gateway Mobile Location Centre (GMLC) 218. In some embodiments, such as in the case of non-emergency calls, Public Safety Answering Point (PSAP) 220 may not be contacted. Instead, a predetermined number such as, but not limited to, a number associated with operation center 206 or responsible requesting party 204 may be contacted.

Figure 3:
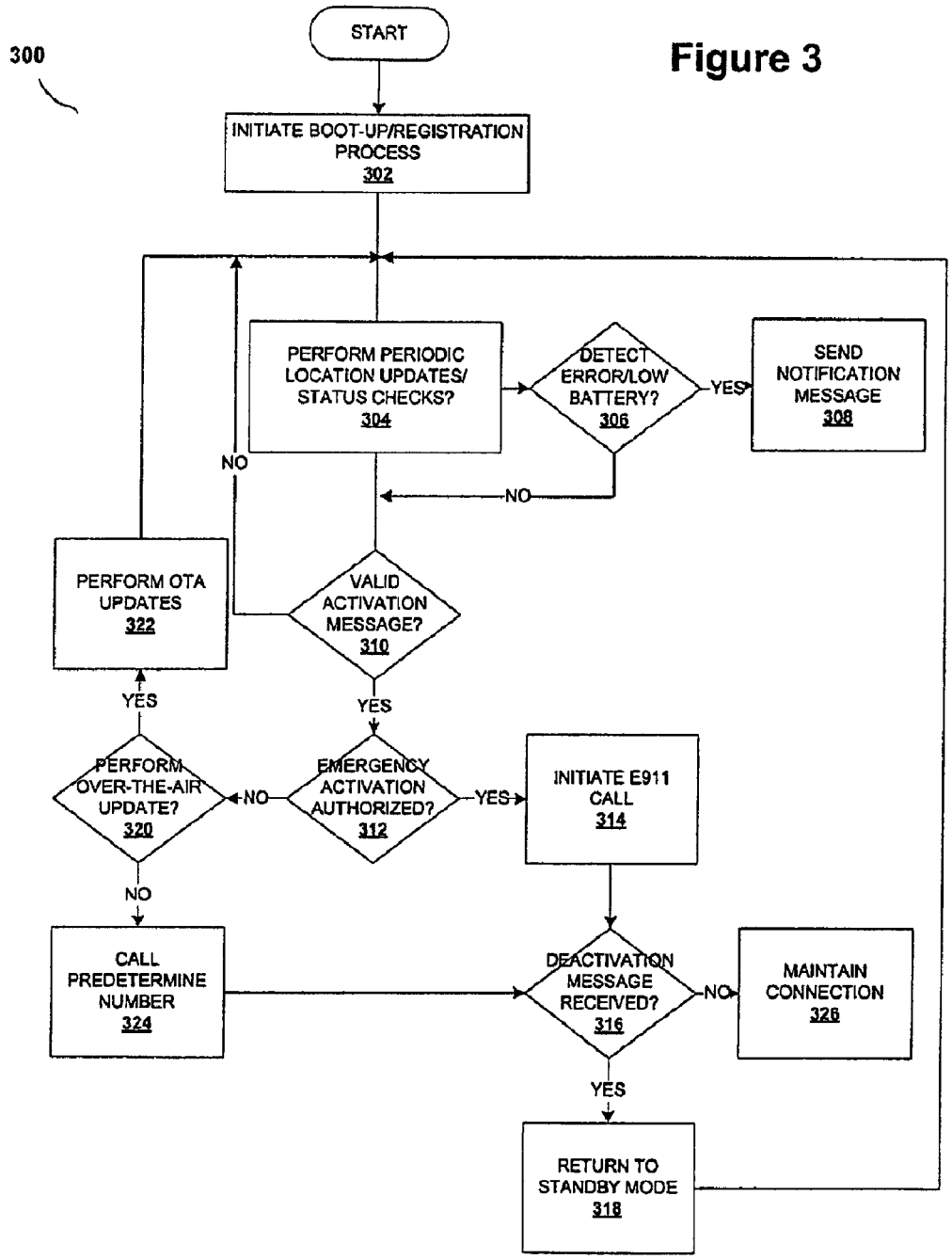
FIG. 3 is a flow diagram illustrating an embodiment of a method for locating an entity attached to the locator device of FIG. 1.

With reference now to FIG. 3, a flow diagram 300 is presented illustrating an embodiment of a method for locating an entity attached to and/or associated with device 100. The method in FIG. 3 may be implemented by a microprocessor on a component of device 100 such as, but not limited to, electronic module 102. The method begins by initiating boot-up of device 100 (block 302). Part of the process of initiating boot-up of device 100 at block 302 includes provisioning device 100 with the settings with which to access various services such as Wireless Application Protocol (WAP) or Multimedia Messaging Service (MMS). WAP is an open international standard for applications that use wireless communication such as enabling access to the Internet from a cellular device. Multimedia Messaging Service is a standard that allows sending text messages such as in Short Message Service (SMS) messages in addition to multimedia objects. In addition, device 100 performs a registration process with the cellular network 114 to gain access to and/or use cellular network 114. Once device 100 completes block 302, device 100 enters into a standby mode.

In standby mode, device 100 is able to communicate with cellular network 114 over the control channels of cellular network 114 while maintaining a low power state. In some embodiments, device 100 performs periodic location updates and status checks including, but not limited to, checking the status of power source 106 (block 304). If device 100 detects an error and/or if power source 106 is low (block 306), device 100 may send a notification message over the control channels of cellular network 114 to operation center 206 and/or to responsible requesting party 204 (block 308). In some embodiments, to conserver power consumption of device 100, the periodic checks are only performed after receiving a message from operation center 206 containing a status request/command. In this case, even if the device is operating properly, the status of device 100 may be reported back to operation center 206.

Device 100 may also receive activation messages while in standby mode. An activation message may be a specific signal activating device 100 when received and/or may contain a command when executed activates device 100. Upon receiving an activation message, device 100 determines if the received activation message is valid (block 310). In some embodiments, the activation message may be encrypted and requires proper decryption before device 100 can enter an active state. The encryption algorithm/method may include asymmetric/symmetric methods of cryptography or any other method of cryptography. In some embodiments, device 100 may authenticate the activation message and/or the location that are transmitted with the activation message. By securing the activation message, device 100 cannot errantly enter an active state by receiving an unauthorized activation message. Upon properly authenticating a received activation message, device 100 determines if emergency activation is authorized (block 312).

If an emergency activation authorization has been received, device 100 automatically initiates an e911 call over a voice channel of cellular network 114 to a Public Safety Answering Point 220 (block 314). An emergency activation authorization may be a specific signal indicating to device 100 to initiate the emergency process when received and/or may contain a command when executed activates the emergency process of device 100. In some embodiments, device 100 may automatically initiate an e911 call over a control/data channel of cellular network 114 to a Public Safety Answering Point 220 (block 314). For example, Public Safety Answering Point 220 may be equipped to receive text messages and/or videos requesting assistance. In these embodiments, device 100 may transmit a stored predetermined data stream to Public Safety Answering Point 220 that provides information about the entity that is missing and/or contact information to the party that initiated the activation of device 100. Enhanced 911 (e911) service is a North American Telephone Network (NANP) feature of the 911 emergency-calling system that automatically associates a physical address with the calling party's telephone number as required by the Wireless Communications and Public Safety Act of 1999. In the case of a land-line, this may be performed using a telephone directory. In the case of a mobile device, such as device 100, this may be performed by, but not limited to, using some form of radiolocation. Radiolocation uses base stations of cellular network 114 to determine the location of device 100. Most often, this is done through triangulation between radio towers. The location of device 100 can be determined several ways including, but not limited to, Angle of Arrival (AOA), Time Difference of Arrival (TDOA), and/or by using location signatures. Angle of Arrival (AOA) requires at least two towers, locating the caller at the point where the lines along the angles from each tower intersect. Time Difference of Arrival (TDOA) is similar to GPS using multilateration, except that it is the networks that determine the time difference and therefore distance from each tower. Location signature uses "fingerprinting" to store and recall patterns (such as multipath) which mobile phone signals are known to exhibit at different locations in each cell.

In some embodiments, device 100 plays a prerecorded audible message in response to determining that the e911 call has been answered by Public Safety Answering Point 220. In addition, in some embodiments, device 100 may send a confirmation message to a party, such as, but not limited to, operation center 206, that transmitted the activation command confirming that the call had been placed and answered. Device 100 maintains the connection with Public Safety Answering Point 220 until a deactivation message is received from operation center 206 (block 316). In some embodiments, the deactivation message may be transmitted by a party at Public Safety Answering Point 220 as well as by the operation center 206. Deactivation may occur to conserve power source 106 of device 100. The deactivation message may also require authenticating. Upon receiving and/or authenticating the deactivation message, device 100 returns to standby mode (block 318). Device 100 may be reactivated once emergency personnel are in the vicinity of device 100. Further, in some embodiments, device 100 may automatically return to standby mode to conserve power after a predetermined time or event such as, but not limited to, when a cellular signal is lost. In this instance, device 100 may automatically reinitiate an e911 call after a signal is detected.

If at block 312 a non-emergency authorization is received, device 100 determines if an update command was received to perform over-the-air (OTA) programming (block 320). OTA programming is a method of distributing new software/firmware updates to cellular devices having the settings for accessing services such as WAP or MMS. If an update command was received, device 100 performs OTA updates (block 322). OTA updates functionality enables flexible adaptation of device 100 features for changing conditions. For example, device 100 may initially be configured for emergency E911 call origination only, but in the future the subscriber may wish to allow for non-emergency geo-location services. This change of software capabilities may be performed wirelessly using OTA programming under the direction of the operation center 206.

If at block 320 an update command was not received, device 100 performs non-emergency functionality by initiating a call over a voice channel of cellular network 114 to a predetermined number such as operation center 206 (block 322). For example, this may occur in the case of responsible requesting party 204 reporting to operation center 206 that device 100 is attached to a missing pet. Device 100 maintains the connection until a deactivation message is received (block 316). Device 100 then returns to standby mode (block 318).

Figure 4:
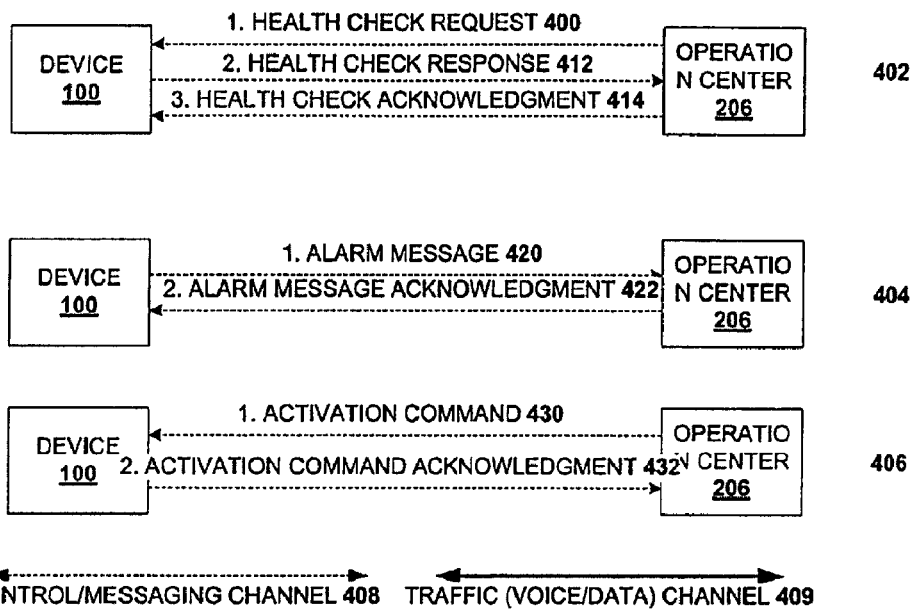
FIG. 4 is a sequence diagram illustrating an embodiment of the communication paths of the locator device of FIG. 1 in standby mode.

FIG. 4 is a sequence diagram 400 illustrating an embodiment of the communication paths between operation center 206 and device 100 in standby mode. In the embodiment illustrated in FIG. 4, three types of messages/commands are transmitted over a control/messaging channel 408 of cellular network 114. Cellular network 114 also includes traffic (voice/data) channels, such as traffic (voice/data) channel 409.

During message exchange 402, operation center 206 transmits a health check request 410 to device 100. Device 100 responds with a health check response 412. Operation center 206 may then transmit a response, a health check acknowledgement 414, acknowledging receipt of health check response 412.

In message exchange 404, during a periodic check, as described above, device 100 may determine that power source 106 is low. In response, device 100 may initiate an alarm message 420 notifying operation center 206 that power source 106 is low. In some embodiments, operation center 206 may send an alarm message acknowledgement 422 in response to receiving alarm message 420. Operation center 206 may then notify responsible requesting party 204 that device 100 requires power source 106 to be recharged and/or replaced. In some embodiments, device 100 may directly transmit alarm message 420 to notify a subscriber such as responsible requesting party 204 that power source 106 is low. In addition, device 100 may automatically activate an indicator on device 100 such as an LED light to indicate power source 106 is low. In some embodiments, operation center 206 may remotely activate the indicator on device 100.

During message exchange 406, operation center 206 may transmit an activation command 430. Device 100 may then proceed as described in the embodiments illustrated in FIG. 3. In addition, device 100 may send an activation command acknowledgement 432 in response to receiving activation command 430.

Figure 5:
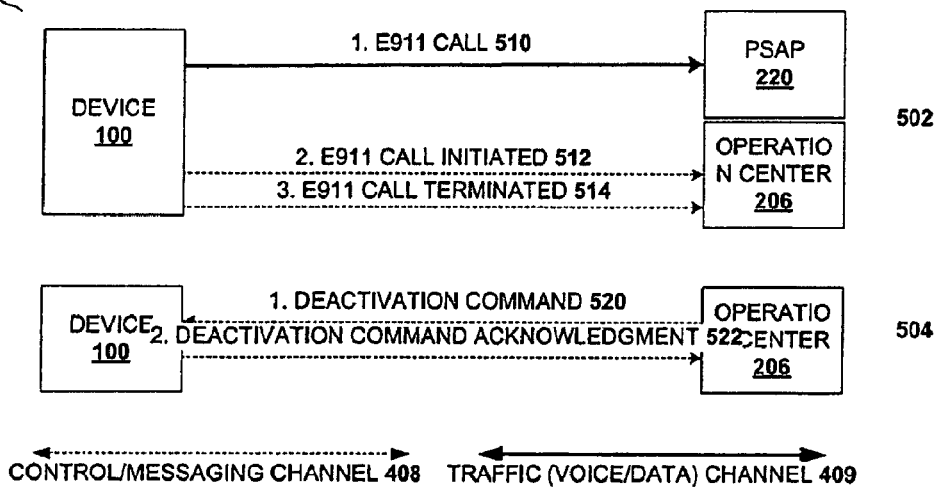
FIG. 5 is a sequence diagram illustrating an embodiment of the communication paths of the locator device of FIG. 1 in active emergency mode.

FIG. 5 is a sequence diagram 500 illustrating an embodiment of the communication paths of device 100 in active emergency mode. In message exchange 502, after receiving and verifying activation command 430 as authorizing emergency action, device 100 initiates a 911 call 510 over traffic (voice/data) channel 409 to Public Safety Answering Point 220. Public Safety Answering Point 220 determines the location of device 100 based on the location from which the call was initiated within cellular network 114. Device 100 then transmits over control/messaging channel 408 a message 512 indicating that a 911 call has been initiated. Once device 100 determines that the 911 call has been terminated, device 100 transmits over control/messaging channel 408 a message 514 indicating that the 911 call has been terminated. In some embodiments, device 100 may initiate a connection between operation center 206 and Public Safety Answering Point 220.

In some embodiments, operation center 206 may deactivate device 100 and return device 100 to standby mode to conserver power source 106. For example, during message exchange 504, operation center 206 may send device 100 a de-activation command 520 over control/messaging channel 408. Device 100 may return a de-activation command acknowledgement 522 in response to either receiving de-activation command 520 and/or in response to actually de-activating device 100.

Figure 6:
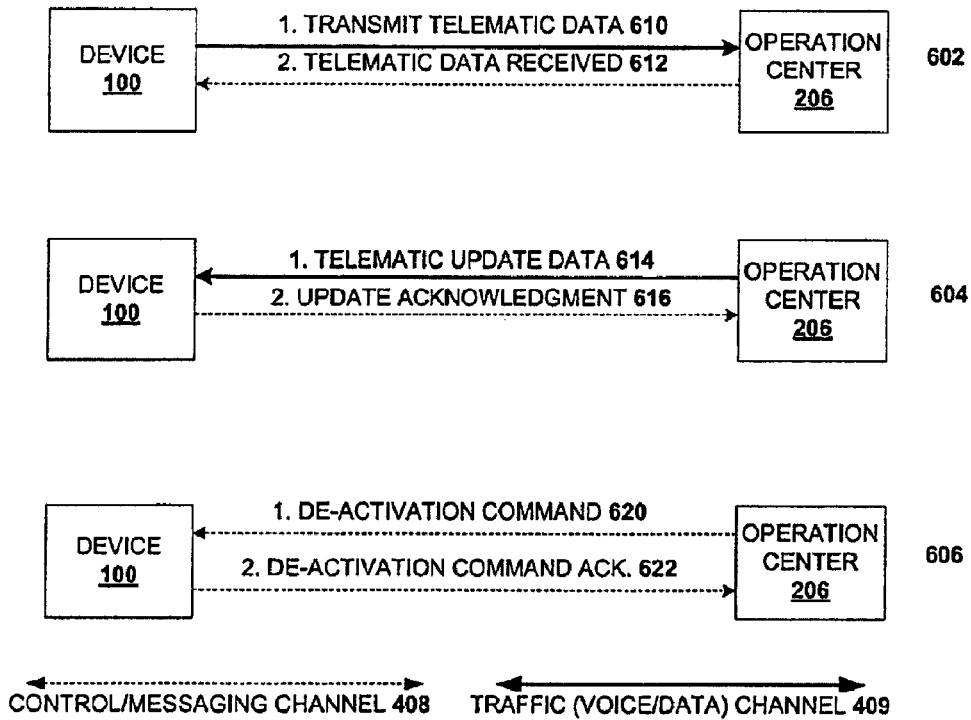
FIG. 6 is a sequence diagram illustrating an embodiment of the communication paths of the tracking device of FIG. 1 in non-emergency mode.

FIG. 6 is a sequence diagram 600 illustrating an embodiment of the communication paths between operation center 206 and device 100 in active non-emergency mode. In the embodiment illustrated in FIG. 6 during message exchange 602, device 100 transmits telematic data 610 to operation center 206 over traffic (voice/data) channel 409. Telematic data 610 is any data that is sent, received, and/or stored via telecommunication devices. Telematic data 610 may be used by operation center 206 to determine the location of and to provide updates to device 100 in non-emergency situations. Operation center 206 may return an acknowledgement 612 that telematic data 610 has been received over control/messaging channel 408.

In addition, during message exchange 604, operation center 206 may update device 100 in real time such as, but not limited to, changing the default parameters of device 100 over traffic (voice/data) channel 409. For example, operation center 206 may transmit telematic update data 614 to change the default activation time parameter to keep device 100 activated for a longer or shorter period of time during an emergency situation and/or update the prerecorded audible message or the predetermined data stream. Device 100 may transmit an update acknowledgment 616 in response to performing the received updates.

During message exchange 606, operation center 206 may send device 100 a de-activation command 620 over control messaging channel 408. Device 100 may return a de-activation command acknowledgement 622 in response to either receiving de-activation command 620 and/or in response to actually de-activating device 100.

Figure 7:
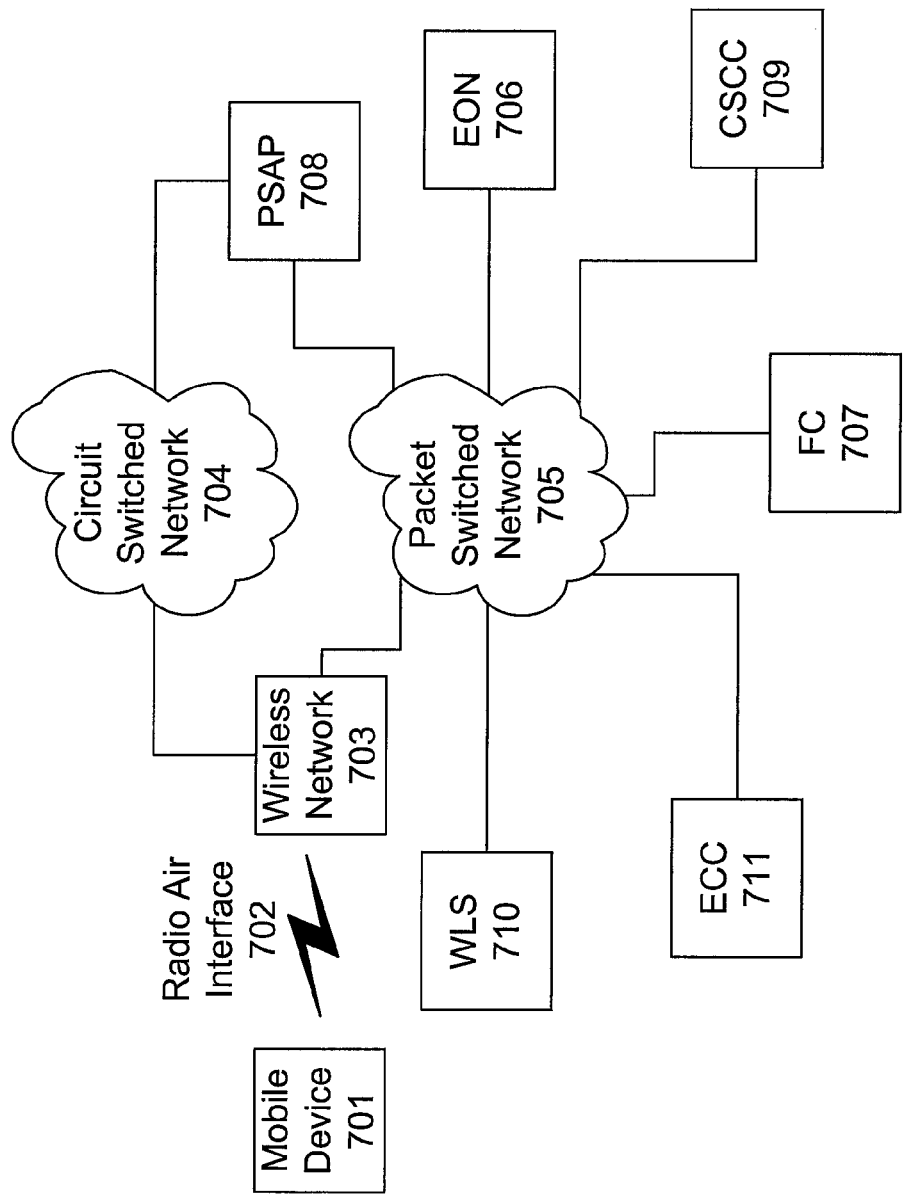
FIG. 7 is a depiction of a multi-mode mobile device and supporting network.

FIG. 7 depicts a schematic representation of a deployment of the Remotely Activated Locator System in a multi-mode scenario where multiple air interfaces (such as GSM and UMTS, GSM and LTE, GSM with UMTS and LTE, and/or various combinations of radio air interface technologies including the IEEE 802 WiFi, WiMAN, and WiMAX systems) are available to the mobile device 701. Shown are the functional components and the interconnections, both wired and wireless.

The mobile locator device 701 (also known as a Mobile Station (MS), a User Equipment (UE) or handset) is capable of communicating via using a radio air interface 702 with the local wireless communications system (WCN) 703. The radio air interface 702 includes uplink and downlink communication channels as defined in interoperability standards set for the radio air interface type (for instance, the GSM radio air interface (the Um interface) was originally developed by the European Telecommunications Standards Institute (ESTI) and the UMTS (the Uu interface) and LTE air interfaces were both developed by the $3^{rd}$ Generation Partnership Program (3GPP) while the 802.11, 802.16 and 802.20 air interfaces were developed by the Institute of Electrical and Electronic Engineers (IEEE).

The mobile device 701 may be a customized hardware platform designed as a remotely activatable locator or may be generic mobile platform (e.g., a smart phone) running the remotely activatable locator software application as an application.

The local wireless communications system (WCN) 703 provides the mobile device 701 communications linkage with switching (circuit switched) signaling systems 704 and routing (packet switched) signaling systems 705 and thus to various telecommunications services including location-based services. Communications provided by the WCN 703 to the mobile device 701 include short message service (SMS), packet data, and voice services. The WCN 703 also includes the Home Location Register (HLR) or Home Subscriber Service (HSS) where the locator device 701 is provisioned, allowing functionality on the local WCN 703 or remote WCNs (not shown)

The Circuit Switched Network 704 comprises the signaling (SS7) and transport (trunks) needed for interconnection of voice communications and switched circuit data.

The Packet Switched Network 705 comprises the signaling and transport needed for routing of packetized data.

The Operations Network (EON) 706 is a cluster of processors, interface gateways, user interfaces, and databases running the applications necessary to support a full range of functions and security.

The EON 706 maintains and stores critical customer and device information. The EON 706 also provides the network interface to the mobile devices 701 for any functions such as device registration, emergency activation, deactivation, and device monitoring. These functions are provided to user interfaces at the Fulfillment Center 707, Customer Service Center 709, and the Emergency Call Center 711. The EON maintains access privileges for these user interfaces to securely control and monitor the functions that each user can employ based on the user profile or role.

The Fulfillment Center (FC) 707 is an operational center that handles customer orders, warehousing, returns and shipping of the mobile locator device 701.

The Public Safety Answering Point 708 is the office that receives emergency services (in the US 9-1-1) calls from the public and provides dispatch services for emergency responders. A PSAP 708 may be a fire or police department, an ambulance service or a regional office covering all services. The FCC further defines a 'primary' and 'secondary' PSAP's where a primary PSAP as a PSAP to which 9-1-1 calls are routed directly from the 9-1-1 Control Office, such as, a selective router or 9-1-1 tandem. A "secondary" PSAP is defined as a PSAP to which 9-1-1 calls are transferred from a primary PSAP. The PSAP 708 may also provide emergency alerts to local wireline or wireless devices.

The Customer Support Call Centers (CSCC) 709 is the central operational site for the administration and handling of product support issues and communications concerning the product with current or future clients and customers. Communications handled by the CSCC 709 include postal mail, voice calls, facsimile or Email communications. The CSCC 709 may be a sited at single location or distributed in a regional or local fashion.

The Wireless Location System (WLS) 710 allows positioning of the locator device 701. Depending on the type of wireless communications network (WCN) 703 and the capabilities of the WCN 703 and the mobile locator device 701, either or both network-based or mobile-based location may be possible via the WLS 710. Location capability may also vary between the local WCN 703 and remote Wireless communications networks.

The Emergency Call Center (ECC) 711 is the operational center that performs emergency activations and deactivations of the mobile devices 701.

When the remotely activatable locator is in the form of a software application installed on a generic mobile device, the EON 706 or ECC 711, as a service bureau application, may perform additional authentication and access control tasks to prevent unintended or malicious activations.

When the remotely activatable locator is in the form of a software application installed on a generic mobile device and the service bureau application is not used, the EON 706 or ECC 711 may still be used in the tracking of unintended or malicious activations working local law enforcement.

Network-based location solutions use specialized receivers and/or passive monitors within, or overlaid on, the wireless communications network to collect uplink (mobile device-to-base station) signaling used to determine location and velocity of the mobile device.

Network-based techniques include uplink Time-Difference-of-Arrival (TDOA), Angle-Of-Arrival (AOA), Multipath Analysis (RF fingerprinting), and signal strength measurement (SSM).

Mobile-device based location solutions use specialized electronics and/or software within the mobile device to collect signaling. Location determination can take place in the device or information can be transmitted to a landside server which determines the location.

Mobile Device-based location techniques include CID (serving Cell-ID), CIDTA (serving cell-ID plus time-based ranging), Enhanced Cell-ID (ECID, a serving cell, time-based ranging and power difference of arrival hybrid), Advanced-Forward-Link-Trilateration (AFLT), Enhanced Observed Time Difference (E-OTD), Observed-Time-Difference-of-Arrival (OTDOA) and Global Navigation Satellite System (GNSS) positioning. The current example of a GNSS system is the United States NavStar Global Positioning System (commonly known as GPS).

The WLS 710 can be equipped to transmit assistance data to the mobile locator device 701 via either control-plane or user-plane methods. Control plane uses the control signaling and equipment integrated into the WCN 703 and Radio Air Interface 702 to provide a signaling and radio channel information to the WLS 710 or mobile device 701. The user plane relies on the WCN 703 to provide a generic packet data connection between the WLS 710 or mobile device 701 and then uses packet data signaling between the WLS 710 and mobile device 701 to collect and transmit location-related messaging (see U.S. patent application Ser. No. 11/53,310, "USER PLANE UPLINK TIME DIFFERENCE OF ARRIVAL", Ward, et al, for a specific example of user-plane enablement of a network-based location technology).

Hybrids of the network-based and mobile device-based techniques can be used to generate improved quality of services including speed, accuracy, yield, and uniformity of location (see U.S. Pat. No. 7,440,762, "TDOA/GPS Hybrid Wireless Location System", Maloney, et al; for a specific example of a network-based or mobile-based hybrid location technique). Also the selection of air interface technology is possible in multi-mode systems and can be used to improve location accuracy (see U.S. patent application Ser. No. 12/268,719, "Use of radio access technology diversity for location", Mia et al. filed Nov. 11, 2008 as an example of this technique.)

CONCLUSION

In sum, the illustrative embodiments described herein provide a system for assisting emergency personnel in locating an entity, such as a missing person, carrying or wearing a locator device such as device 100. Embodiments of the system, such as locator system 200, provide a more reliable method and apparatus for locating a missing entity than other locating methods by overcoming the problems associated with other locating methods as described above. For example, the entity attached to device 100 is not required to perform any action to activate device 100, which is crucially important in the case of a confused elderly person or a minor child. In addition, the illustrative embodiments may be implemented in the current e911 system without requiring the added costs associated with purchasing special tracking equipment and/or requiring personnel training. Further, the illustrative embodiments provide a method and apparatus for locating an entity in non-emergency situations and for updating device 100 wirelessly over cellular network 114. Accordingly, the true scope the present invention is not limited to the presently preferred or illustrative embodiments disclosed herein; and except as they may be expressly so limited, the scope of protection of the following claims is not intended to be limited to the specific embodiments described above.

What is claimed:

1. A method for locating an entity attached to a locator device, wherein the locator device is configured to be in a standby state and to enter an active state upon receiving an activation message, wherein during the standby state the locator device is able to communicate with a cellular network over a control channel of the cellular network while maintaining a low power state, the method comprising:
receiving, at the locator device, an activation message over a control channel of a cellular network;
authenticating the message;
determining whether emergency activation has been authorized;
if emergency activation has not been authorized, performing at least one of (1) initiating a voice channel call, over a voice channel of the cellular network, by calling a predetermined number, and (2) performing an over the air update of the locator device;
if emergency activation has been authorized, automatically initiating a voice channel call over a voice channel of the cellular network, wherein the voice channel call is a public assistance or emergency call;
responsive to determining that the voice channel call has been answered, playing a prerecorded audible message providing information about the entity;
sending a confirmation message to a party that transmitted the activation message confirming that the voice channel call has been placed by the locator device; and
determining that the voice channel call has been answered, and in response to determining that the voice channel call has been answered, transmitting information about the entity;
wherein the locator device comprises a radio communications device configured to communicate with the cellular network, wherein the cellular network comprises at least one of a time and frequency division multiplexed (TDMA/FDMA) radio communications system and a code-division radio communications system.

2. The method of claim 1, further comprising remotely updating the locator device.

3. The method of claim 1, further comprising transmitting a status of the locator device to an operation center over the control channel of the cellular network.

4. The method of claim 1, further comprising initiating, by the locator device, a multiparty call between a party answering the voice channel call and the party that transmitted the activation message.

5. The method of claim 1, further comprising sending a confirmation message to the party that transmitted the activation message confirming that the voice channel call has been placed.

6. The method of claim 1, wherein the voice channel call is placed to a public safety answering point.

7. The method of claim 1, further comprising playing a prerecorded audible message providing contact information to the party that transmitted the activation message.

8. The method of claim 1, further comprising, responsive to a status indicating that a power source of the locator device is low, transmitting a remote notification to a party that the power source is low.

9. A locator device comprising:
an electronic module configured to perform the following process:
receiving, at the locator device, an activation message over a control channel of a cellular network;
responsive to receiving the activation message, automatically authenticating the activation message and, upon authentication of the activation message, determining whether emergency activation has been authorized;
if emergency activation has not been authorized, performing at least one of (1) initiating a voice channel call, over a voice channel of the cellular network, by calling a predetermined number, and (2) performing an over the air update of the locator device;
if emergency activation has been authorized, automatically initiating the voice channel call over a voice channel of the cellular network, wherein the voice channel call is a public assistance or emergency call; and
sending a confirmation message to a party that transmitted the activation message confirming that the voice channel call has been placed by the locator device;
wherein the locator device is configured to communicate with a cellular network comprising at least one of a time and frequency division multiplexed (TDMA/FDMA) radio communications system and a code-division radio communications system;
wherein the locator device is configured to be in a standby state and to enter an active state upon receiving a properly authenticated activation message; and wherein during the standby state the locator device is able to communicate with the cellular network over a control channel of the cellular network while maintaining a low power state.

10. The locator device of claim 9, further comprising a processor for initiating a multiparty call between a party answering the voice channel call and the party transmitting the activation message.

11. The locator device of claim 9 disguised as an accessory item.

12. The locator device of claim 9, further comprising a global positioning system component.

13. The locator device of claim 9, further comprising a processor for returning the device to lower power inactive mode.

14. A system for locating an entity, comprising:
a wireless location system;
a locator device attachable to the entity, wherein the locator device is configured to perform the following process:
  receiving, at the locator device, an activation message over a control channel of a cellular network;
  responsive to receiving the activation message, automatically authenticating the activation message and, upon authentication of the activation message, determining whether emergency activation has been authorized;
    if emergency activation has not been authorized, performing at least one of (1) initiating a voice channel call, over a voice channel of the cellular network, by calling a predetermined number, and (2) performing an over the air update of the locator device;
    if emergency activation has been authorized, automatically initiating a voice channel call over a voice channel of the cellular network, wherein the voice channel call is a public assistance or emergency call, and wherein the voice channel call enables location of the locator device by the wireless location system; and
  sending a confirmation message to a party that transmitted the activation message confirming that the voice channel call has been placed by the locator device;
wherein the locator device is configured to communicate with a cellular network comprising at least one of a time and frequency division multiplexed (TDMA/FDMA) radio communications system and a code-division radio communications system;
wherein the locator device is configured to remain in a standby state and to enter an active state upon receiving a properly authenticated activation message; and
wherein during the standby state the locator device is able to communicate with the cellular network over a control channel of the cellular network while maintaining a low power state.

15. The system of claim 14, further comprising means for authenticating the message.

16. The system of claim 14, further comprising means for playing a prerecorded audible message providing information about the entity to be located in response to determining that the voice channel call has been answered.

17. The system of claim 14, further comprising means for remotely updating the locator device.

18. The system of claim 14, further comprising means for transmitting a status of the locator device to an operation center over the control channel of the cellular network.

19. The system of claim 14, further comprising means for initiating a multiparty call between a party answering the voice channel call and the party that transmitted the activation message.

20. The system of claim 14, further comprising means for sending a confirmation message to the party that transmitted the activation message confirming that the voice channel call has been placed.

21. The system of claim 14, wherein the voice channel call is placed to a public safety answering point.

22. The system of claim 14, further comprising means for playing a prerecorded audible message providing contact information to the party that transmitted the activation message.

23. The system of claim 14, further comprising means for transmitting a remote notification to a party that the power source is low.

24. The system of claim 14, wherein the locator device further comprises memory for storing a prerecorded audible message; and a processor for playing the prerecorded audible message in response to determining that the voice channel call has been answered.

25. The system of claim 14, wherein the locator device further comprises memory for storing identifying information of a subscriber associated with the locator device.

26. The system of claim 14, wherein the locator device further comprises a processor configured to initiate a multiparty call between a party answering the voice channel call and the party transmitting the activation message.

27. The system of claim 14, wherein the locator device is disguised as an accessory item.

28. The system of claim 14, wherein the locator device further comprises a global positioning system component.

29. The system of claim 14, wherein the locator device further comprises a processor configured to return the device to lower power inactive mode.

* * * * *